March 7, 1950 W. DZUS 2,499,574
ADJUSTABLE FASTENER RECEPTACLE
Filed Oct. 31, 1944
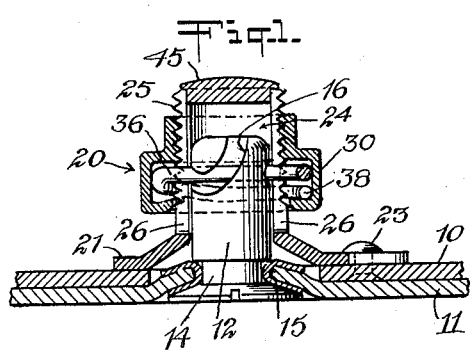
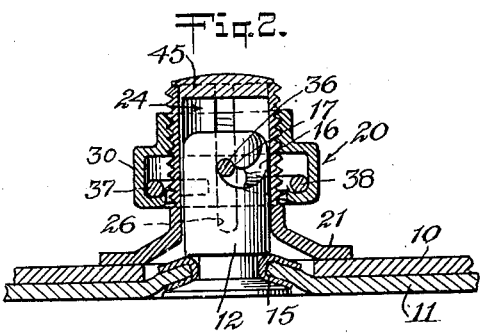
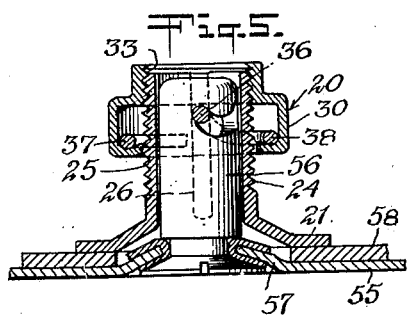
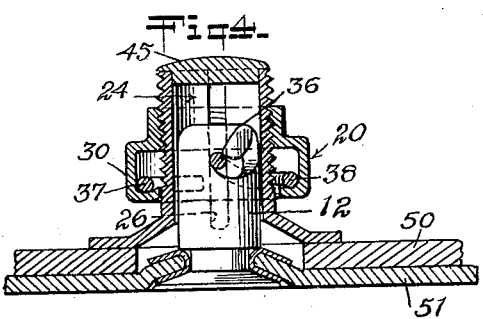
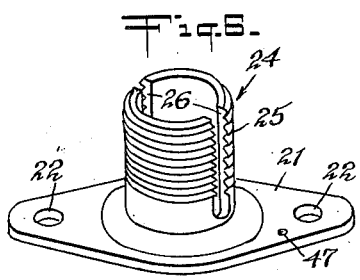
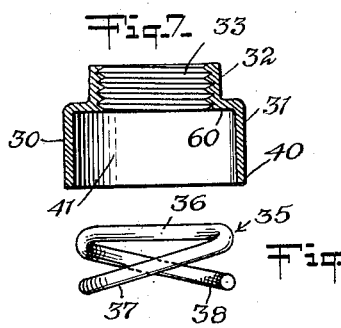
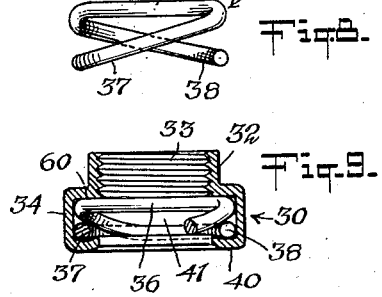
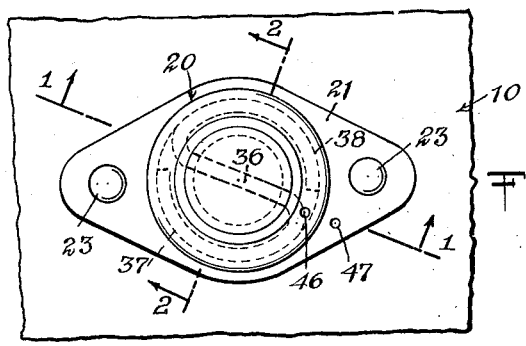
INVENTOR.
William Dzus
BY
Munn, Liddy & Glaccum
ATTORNEYS Patented Mar. 7, 1950

2,499,574

UNITED STATES PATENT OFFICE 2,499,574

ADJUSTABLE FASTENER RECEPTACLE

William Dzus, West Islip, N. Y.

Application October 31, 1944, Serial No. 561,204

11 Claims. (Cl. 24—221)

This invention relates to fasteners and, more particularly, to a receptacle for a fastener of the type employing a stud and a receptacle adapted to interengage with each other upon rotation of one of the members. Fasteners of this type may be used to detachably hold together two members of any type, for instance, two plates, and are extensively used for fastening detachable plates, and covers. A particular use for fasteners of this type is in fastening the engine cowling of aircraft where, due to their quick operation and ability to hold under tension without adverse effect from vibration, they are particularly useful.

One of the problems heretofore met with fasteners of this type has been due to variations in the material with which they were used and difficulties in installation. The receptacle and fastener in the older type must necessarily match and be so installed that proper tension is placed on the cross bar of the receptacle when the fastener was closed. Where the parts held together varied in thickness or where errors were made in installation the efficiency of the fasteners was necessarily impaired since the tension desired was not always maintained. Also in previous types of fasteners it was not possible to use studs of various length with the same receptacle to secure materials of the same thickness since the desired tension could not be secured.

An object of this invention is to provide a receptacle with which the desired tension may be secured by adjustment of the receptacle to allow for variations in thickness of plates, grommet installations, bows in plates, and other variations which may occur in installation.

A further object of this invention is to provide a receptacle which is adapted to receive different length studs and which may be adjusted to secure greater or lesser tension as the particular problem requires.

A further object is to provide a receptacle in which the spring element is always pre-loaded so that when first engaged by the stud it is already under tension and there is no necessity of taking up any slack.

A still further object is to provide a receptacle in which the tension may be increased after the fastener is locked so that in semi-permanent installations where it is not necessary to open and close the fastener except at long intervals the tension may be materially increased.

Other objects and advantages of the invention will become apparent from an examination of the drawings and the following description.

In the drawings—

Figure 1 is a cross sectional view of an assembled fastener embodying my receptacle taken on the line 1—1 of Figure 3;

Fig. 2 is a cross sectional view taken at right angles to Fig. 1 on the line 2—2 of Fig. 3;

Fig. 3 is a plan view of the receptacle shown in Figures 1 and 2;

Fig. 4 is a cross sectional view showing my fastener applied to and adjusted for plates of different thickness;

Fig. 5 is a cross sectional view showing a modified form of receptacle used with a stud of greater length;

Fig. 6 is a perspective view of a portion of the receptacle before assembly;

Fig. 7 is a cross sectional view of the spring carrying member before assembly;

Fig. 8 is a view of the spring before assembly;

Fig. 9 is a cross sectional view of spring carrying member and the spring after assembly.

Referring more particularly to the drawings, as shown in Figures 1 and 2 the fastener assembly is adapted to hold together plates 10 and 11. Mounted in the plate 11 is a stud 12. Stud 12 is provided adjacent its head with a grommet groove 14, is positioned in the plate 11 by means of the grommet 15, and is free to rotate therein. The stud 12 is provided with a spiral slot 16 terminating in a cam shoulder 17 defining a detent.

Mounted on the plate 10 is the receptacle member 20 which includes the base member 21 which may be riveted through the openings 22 to the plate 10 by means of the rivets 23 or which may be welded or otherwise fastened in place. Mounted on the member 21 is a tubular member 24 provided with external threads 25 and slots 26. The tubular member 24 is adapted to receive the spring carrying collar member 30 which consists of a collar 31 having a neck 32 internally threaded at 33 to engage the threads 25 and the spring 35. Spring 35 is provided with a locking bar in the form of cross bar 36 with end members 37 and 38 bent in an S formation, as clearly shown in Figure 3. In preparing the member 30 the lower walls 40 of the collar member are formed straight.

In assembly, the spring member 35 is inserted within the chamber 41 defined by the collar member and then compressed so as to be pre-loaded and the ends 40 flared inwardly to hold the spring under compression. The spring carrying collar 30 is then screwed onto the tubular member 24 with the cross bar 36 resting in the slots 26. The tension of the ends 37 and 38 against the walls of the chamber 41 will be such as to allow the rotation of the collar but sufficient to hold it in place after rotation. The outer wall 34 of the collar is preferably nurled or roughened to provide a convenient grip. To complete the assembly a cap 45 may be sprung or soldered into place in the open end of the tubular member 24. This cap not only tends to cover the end of the tubular member but also supports the walls thereof and prevents the narrowing of the slots 26 under pressure.

Since the threads 25 and 33 may be made of predetermined pitch the exact travel of the collar on the tubular member during one revolution may be predetermined. The collar may be marked at 46 and the member 21 at 47 with register marks so as to determine the exact number of turns made in adjustment.

In Figure 4 the receptacle is shown with the stud holding two plates 50 and 51 together. Due to the thickness of the plate 50 the stud 12 cannot travel as far within the receptacle 20 as would be the case if the plate 50 were as thin as the plate 10 and it is, therefore, necessary to screw the receptacle down on the tubular member 24 to allow engagement of the cross bar 36 by the slot 16. In comparing Figures 2 and 4 it will be noted that the receptacle 20 has been screwed down a distance equal to difference in the thickness of the plates 50 and 10. In Figure 5 the fastener is holding together the plates 55 and 58. In this case the stud 56 has a longer over-all length than the studs shown in Figures 1, 2 and 4. Under such circumstances the receptacle 20 is screwed further out on the tubular member 24 to provide the proper tension on the cross bar 36 when the fastener is closed or locked. The foregoing illustrations show variations due to different thicknesses of plates and length of studs.

Other variations occur in installing fasteners, particularly of the flush type as shown, where the plate 55 is bowed inwardly at 57 to bring the head of the stud flush with the surface of the plate. While this bow is usually formed by precision tools it will be appreciated that variations will occur which will affect the tension on the cross bar 36 when the fastener is locked.

It will be noted that when the spring carrying collar member is assembled the ends of the cross bar 36 are in pressure contact with the flange 60 within the chamber 41. However, when the fastener is locked the cam action of the stud will pull the cross bar downwardly so that there will be a slight space between the flange 60 and the cross bar, as clearly shown in Figure 1.

It is believed obvious from the foregoing that not only can my receptacle be adjusted to overcome variations in thickness of the parts held together but also may be adjusted to receive studs of different length. Moreover, the amount of tension on the cross bar 36 may be adjusted for different installations in accordance with the needs of the particular installation. In other words, where one installation might require X pounds tension to prevent separation of the plates, another installation might require twice as much tension. This may be supplied by setting the collar further out on the tubular member before or after the fastener is locked.

Various modifications of my receptacle may be made without departing from the spirit of the invention and it may be readily adapted to different types of studs.

I claim:

1. In a separable fastener a receptacle member comprising an externally threaded slotted tubular member, an internally threaded collar member on said tubular member, and a cross bar carried by said collar member and engaged by said slots.

2. A fastener element comprising a tubular member, said tubular member having a pair of oppositely disposed slots, a collar member adjustably mounted on said tubular member, a spring having a cross bar mounted in said collar member, said cross bar engaging said slots, and said spring member being under predetermined tension.

3. A fastener element including a slotted tubular portion, a collar member adjustably mounted on said tubular portion, a spring member associated with said collar member, a cross bar disposed through said slot and operatively associated with said spring, said cross bar being adapted to be engaged by a stud having a spiral slot in one end and a detent on the inner recess of said slot, and means for varying the position of said cross bar to properly position the same with relation to said stud.

4. In a separable fastener a receptacle member including a threaded member having oppositely disposed slots, a collar engaging said threaded member having a chamber therein, a spring having a cross bar mounted in said chamber, said cross bar being engaged by said slots and the ends of said spring being engaged and compressed by said chamber by reason of which said spring, while free to rotate in said chamber, is maintained under predetermined pressure.

5. In a separable fastener a receptacle member including a threaded member having oppositely disposed slots, a threaded collar on said threaded member, and a cross bar resiliently mounted in said collar and disposed through said slots.

6. In a separable fastener a receptacle member comprising an externally threaded slotted tubular member, an internally threaded collar member on said tubular member, a cross bar carried by said tubular member and disposed in said slots, and a reinforcing cap positioned in the outer end of said tubular member.

7. A fastener element comprising a tubular member, said tubular member having a pair of oppositely disposed slots, a collar member adjustably mounted on said tubular member, a spring having a cross bar mounted in said collar member, said cross bar being disposed across said slots, and a reinforcing cap member in the outer end of said tubular member.

8. In a separable fastener a receptacle member comprising a tubular member, said tubular member having a slot, a collar member adjustably mounted on said tubular member, a spring having a cross bar rotatably mounted in said collar member and engaging said slot.

9. A fastener element including a tubular member, a collar member on said tubular member, said collar member having means for adjustably positioning it on said tubular member, said collar member having walls defining a chamber, a spring having a cross bar mounted in said chamber under compression whereby the ends of said cross bar normally engage the upper wall of said chamber but may move downwardly under compression, and means for positioning said cross bar with relation to said tubular member.

10. In a separable fastener adapted to cooperate with a fastener element a receptacle member comprising a tubular member, a collar member adjustably mounted on said tubular member, and spring means carried by said collar member adapted to engage said fastener element.

11. In a fastener of the type having a stud and a receptacle interengageable upon the rotation of one with respect to the other, an improved receptacle comprising a base member, a spring-carrying member, and a spring having a locking bar associated therewith mounted on said spring-carrying member, said locking bar being shiftable relative to the spring-carrying member against the force exerted by said spring upon compressing said spring and said spring-carrying member being adjustably mounted on said base member, whereby the position of the spring-carrying member, spring and locking bar may be shifted relative to the base member without compressing the spring.

WILLIAM DZUS.

REFERENCES CITED

The following references are of record in the file of this patent:

UNITED STATES PATENTS

| Number | Name | Date |
|---|---|---|
| 2,317,787 | Mack | Apr. 27, 1943 |
| 2,339,591 | Weber | Jan. 18, 1944 |
| 2,364,906 | Lumsden | Dec. 12, 1944 |

FOREIGN PATENTS

| Number | Country | Date |
|---|---|---|
| 266,164 | Great Britain | Feb. 24, 1927 |